(12) United States Patent
Hommer et al.

(10) Patent No.: US 12,234,303 B2
(45) Date of Patent: Feb. 25, 2025

(54) STABILISERS FOR USE IN INVERSE EMULSION POLYMERISATION PROCESSES

(71) Applicant: SOLENIS TECHNOLOGIES CAYMAN, L.P., George Town (KY)

(72) Inventors: Herbert Hommer, Trostberg (DE); Gregor Herth, Trostberg (DE); Klaus Muehlbach, Ludwigshafen (DE); Jochen Wagner, Ludwigshafen (DE); Rosa Corberan Roc, Ludwigshafen (DE)

(73) Assignee: Solenis Technologies, L.P., Wilmington, DE (US)

( * ) Notice: Subject to any disclaimer, the term of this patent is extended or adjusted under 35 U.S.C. 154(b) by 828 days.

(21) Appl. No.: 17/312,451

(22) PCT Filed: Dec. 6, 2019

(86) PCT No.: PCT/EP2019/084013
§ 371 (c)(1),
(2) Date: Jun. 10, 2021

(87) PCT Pub. No.: WO2020/120323
PCT Pub. Date: Jun. 18, 2020

(65) Prior Publication Data
US 2022/0049028 A1 Feb. 17, 2022

(30) Foreign Application Priority Data
Dec. 10, 2018 (EP) .................................. 18211362

(51) Int. Cl.
*C08F 10/10* (2006.01)
*C08F 2/32* (2006.01)

(52) U.S. Cl.
CPC ............... *C08F 10/10* (2013.01); *C08F 2/32* (2013.01); *C08F 2810/10* (2013.01)

(58) Field of Classification Search
CPC ......... C08F 10/10; C08F 2810/10; C08F 2/32
See application file for complete search history.

(56) References Cited

U.S. PATENT DOCUMENTS

| 3,284,393 A | 11/1966 | Vanderhoff et al. |
| 2006/0063844 A1 | 3/2006 | Nagy et al. |
| 2008/0113890 A1 | 5/2008 | Moreton et al. |
| 2012/0288464 A1 | 11/2012 | Carmichael et al. |

FOREIGN PATENT DOCUMENTS

| CN | 102976876 A | 3/2013 | |
| CN | 102976876 B | 1/2015 | |
| CN | 106589233 A | * 4/2017 | |
| GB | 2183242 B | 12/1939 | |
| JP | 2005511831 A | 4/2005 | |
| JP | 2008539213 A | 11/2008 | |
| JP | 2008544044 A | 12/2008 | |
| RU | 2043997 C1 | 9/1995 | |
| RU | 2540671 C2 | 2/2015 | |
| WO | 200126791 A2 | 4/2001 | |
| WO | 2006135881 A2 | 12/2006 | |
| WO | 2006138269 A2 | 12/2006 | |
| WO | WO-2010132259 A1 | * 11/2010 | ............ C08F 110/10 |
| WO | 2012004300 A1 | 1/2012 | |
| WO | WO-2016187177 A1 | * 11/2016 | |

OTHER PUBLICATIONS

Qiu Binyi, "Modern cosmetic Science and technology", China Light Industry Press, Mar. 31, 2016.
ISA/EP, International Search Report and Written Opinion issued in Int. Appl. No. PCT/EP2019/084013 mailed Jan. 23, 2020.

* cited by examiner

*Primary Examiner* — Robert D Harlan
(74) *Attorney, Agent, or Firm* — Lorenz & Kopf, LLP

(57) ABSTRACT

The present invention is directed to the use of a quaternized derivative of polyisobutylene as stabiliser in inverse emulsions like inverse emulsions used for a reverse-phase emulsion polymerisation process, e.g. for the polymerisation of acrylamide and ethylenically unsaturated cationic monomers. Such emulsions are e.g. used as flocculant for waste water treatment. The present invention is further directed to inverse emulsions comprising a quaternized derivative of polyisobutylene. The inverse emulsions have sufficiently low viscosity and sufficiently high shear stability. The present invention is further directed to an inverse emulsion polymerisation process, wherein the inverse emulsion comprises a quaternized derivative of polyisobutylene.

15 Claims, No Drawings

STABILISERS FOR USE IN INVERSE EMULSION POLYMERISATION PROCESSES

CROSS-REFERENCE TO RELATED APPLICATION

This application is a U.S. National-Stage entry under 35 U.S.C. § 371 based on International Application No. PCT/EP2019/084013, filed Dec. 6, 2019, which was published under PCT Article 21(2) and which claims priority to European Patent Application No. 18211362.1, filed Dec. 10, 2018, which are all hereby incorporated in their entirety by reference.

TECHNICAL FIELD

The present disclosure is directed to the use of a stabiliser which is a quaternized derivative of polyisobutylene (PIB) as an additive for a reverse-phase emulsion polymerisation process, particularly for the polymerisation of acrylamide, ethylenically unsaturated cationic monomers, or ethylenically unsaturated anionic monomers.

BACKGROUND

The inverse emulsion polymerisation process is known to the skilled person. As described in GB 2 183 242 B and U.S. Pat. No. 3,284,393, the procedure of inverse emulsion polymerisation differs from conventional emulsion polymerisation in that the material undergoing polymerisation consists of an emulsion of an aqueous solution of a water-soluble monomer in a continuous oil phase prepared with the aid of a water-in-oil emulsifier rather than of an emulsion in an aqueous continuous phase of a water-immiscible monomer prepared with the aid of an oil-in-water emulsifier. Accordingly, in the inverse emulsion polymerisation process polymerisation of hydrophilic monomers takes place in the aqueous phase, i.e. the hydrophilic monomers are dissolved in the water droplets which are dispersed in an oily phase and stabilized by an emulsifier. This technology leads to the formation of a water-in-oil type emulsion in which very high molecular weight polymers are trapped in aqueous droplets.

GB 2 183 242 B continues to teach that this process is of particular interest for the preparation of water-soluble polymers such as polyacrylamide, which are extensively used as flocculants, for example in sewage treatment. The resulting emulsions have the valuable property that, when appropriately formulated, they readily invert on being diluted into water; in this way an aqueous solution of the high molecular weight polymer is obtained much more readily than by dissolution of the equivalent polymer isolated in powder form. In order for this approach to be commercially attractive, however, it is desirable that the content of polymer solids in the emulsions should be as high as possible, consistent with the emulsion having a low enough viscosity for it to be easily handled. GB 2 183 242 B teaches the application of a certain class of surface active compound as emulsifier which according to a preferred embodiment thereof is based on polyisobutylene succinic acid monoesters or monoamides.

Accordingly, for the manufacture of polyacrylamide (PAM) based inverse emulsions, the aqueous monomer phase is dispersed in mineral oil in the presence of an emulsifier. However, in production, the rather low shear stability of the emulsion leads to lump formation in the vessel and especially in the heat exchanger. Furthermore, during polymer make-up prior application, the inverse emulsion may be exposed to high shear stress, especially in on-line systems. Such shear stress can result in lump formation, and hence, in blockage of the equipment in the worst case. To overcome this issue, it is conventional to additionally add a polymeric stabiliser in low amounts to the monomer phase. Commercially available examples of such a polymeric stabiliser are sold by Croda International PLC (GB) under the tradename Hypermer™ and are described in US 2012/0288464 A1 to be alkoxylated ester oils of long chain fatty acids including an alkoxylated alcohol group.

However, there is still a need of providing more efficient and effective alternatives of such polymeric stabilisers. It is accordingly the object of the present disclosure to provide more efficient and effective alternatives of such polymeric stabilisers.

The present disclosure is based on the finding that the object can be solved by provision of a stabiliser which is a quaternized derivative of polyisobutylene (PIB), e.g. belonging to the class of derivatives of polyisobutylene succinic anhydride (PIBSA), namely quaternized PIBSA-derivatives.

Such compounds are known and are for example disclosed in WO 2006/135881 A2, WO 2006/138269 A2, WO 2010/132259 A1, and WO 2012/004300 A1.

WO 2006/135881 A2 is directed to a quaternary ammonium salt detergent and the use of such quaternary ammonium salt detergents in a fuel composition to reduce intake valve deposits and remove or clean up existing deposits on the intake valves. The quaternary ammonium salt is the reaction product of the reaction of a hydrocarbyl substituted acylating agent and a compound having an oxygen or nitrogen atom capable of condensing with said acylating agent and further having a tertiary amino group; and a quaternizing agent suitable for converting the tertiary amino group to a quaternary nitrogen. The hydrocarbyl substituted acylating agent is preferably polyisobutylene succinic anhydride (PIBSA). The compound having an oxygen or nitrogen atom and further having a tertiary amino group is preferably N,N-dimethyl-aminopropyl-amine (DMAPA). The quaternizing agent is e.g. a hydrocarbyl epoxide like styrene oxide. The resulting quaternary ammonium salt detergent is accordingly e.g. the styrene oxide quaternary ammonium salt of the N,N-dimethyl-aminopropylamine succinimide of polyisobutylene succinic anhydride (PIBSA). WO 2006/138269 A2 is directed to a composition comprising a salt of a dispersant, a particulate solid and an organic medium aiming at providing effective dispersants for uniformly distributing a particulate solid in an organic medium, e.g. for dispersion in inks, paints and plastics. The salt of the dispersant is a salt of a hydrocarbyl-substituted acylating agent which is preferably the reaction product of the reaction of a polyisobutylene succinic anhydride (PIBSA) and N,N-dimethyl-aminopropyl-amine (DMAPA); and compounds like dimethyl sulphate, benzyl chloride, dimethyl carbonate or styrene oxide (quaternizing agent).

WO 2010/132259 A1 is directed to quaternary ammonium amide and ester salts and their use as additives, in particular detergents, in fuels such as diesel fuel and fuel oils. The quaternary ammonium salt detergent containing an amide group or an ester group is the reaction product of a non-quaternized detergent containing an amide group or an ester group, where the detergent has a tertiary amine functionality; and a quaternizing agent. The non-quaternized detergent preferably comprises the condensation product of a hydrocarbyl-substituted acylating agent, like polyisobutylene succinic anhydride (PIBSA), and a compound having an oxygen or nitrogen atom capable of condensing with said acylating agent and further having at least one tertiary amino group, like N,N-dimethyl-1,3-diaminopropane (DMAPA). The quaternizing agent preferably comprises compounds like ethylene oxide or styrene oxide. Disclosed is a method allowing the preferred preparation of a quaternized succinamide detergent in view of the quaternized succinimide detergent.

WO 2012/004300 A1 is directed to acid-free quaternized nitrogen compounds and use thereof as additives in fuels and lubricants, e.g. as additive for reducing internal diesel injector deposits in direct-injection diesel engines. A process for preparing epoxide-quaternized nitrogen compounds is disclosed which allows the addition of free acid to be dispensed with completely.

BRIEF SUMMARY

Stabilisers for use in inverse emulsions, inverse emulsions, and inverse emulsion processes are provided herein. In an embodiment, a quaternized derivative of polyisobutylene is provided for use as stabiliser in inverse emulsions. In another embodiment, an inverse emulsion is provided that includes the quaternized derivative of polyisobutylene. In another embodiment, an inverse emulsion polymerisation process is provided, wherein the inverse emulsion includes a quaternized derivative of polyisobutylene.

DETAILED DESCRIPTION

The present disclosure is accordingly in one aspect directed to the use of a quaternized derivative of polyisobutylene (PIB) as stabiliser in inverse emulsions.

The use according to the present disclosure involves in particular the use as stabiliser for the synthesis and stabilization of inverse emulsions, more particularly the use as stabiliser in inverse emulsions used for a reverse-phase emulsion polymerisation process, e.g. for the polymerisation of acrylamide, ethylenically unsaturated cationic monomers or ethylenically unsaturated anionic monomers. Such emulsions are e.g. used as flocculant for waste water treatment.

As used herein, a quaternized derivative of polyisobutylene (PIB) is a derivative of polyisobutylene (PIB) which contains a quaternary ammonium group. Such compounds are obtainable by reacting a suitable derivative of polyisobutylene (PIB) containing a tertiary amino group (non-quaternized derivative of polyisobutylene (PIB)) with a quaternizing agent.

According to a preferred embodiment of the present disclosure the quaternized derivative of polyisobutylene (PIB) contains an amide or imide link between the polyisobutylene moiety and the quaternary ammonium group.

According to a particular preferred embodiment of the present disclosure the quaternized derivative of polyisobutylene is the reaction product of:
  a) the reaction of a polyisobutylene-substituted acylating agent and a compound having a nitrogen atom capable of reacting with said acylating agent and further having a tertiary amino group; and
  b) a quaternizing agent suitable for converting the tertiary amino group to a quaternary ammonium group;
  wherein the reaction of the polyisobutylene-substituted acylating agent and the compound having a nitrogen atom capable of reacting with said acylating agent is a nucleophilic substitution reaction at an acyl group of the acylating agent resulting in a polyisobutylene-substituted amide or imide.

As indicated already above, a quaternized derivative of polyisobutylene (PIB) as applied according to the present disclosure is known, but not its particular field of application according to the present disclosure.

Polyisobutylene Substituted Acylating Agent

It is preferred that the polyisobutylene-substituted acylating agent is the reaction product of a polyisobutylene and an acylating agent.

The preparation of polyisobutylene by cationic polymerisation of isobutylene (2-metylpropene) is known to the skilled person. The polyisobutylene has preferably a number average molecular weight of 300 to 5000 g/mol. More preferred ranges are 450 to 4000 g/mol, 500 to 3000 g/mol and 550 to 2500 g/mol.

The acylating agent is preferably a monounsaturated carboxylic acid reactant, more preferably an alpha, beta-(mono)unsaturated mono- or polycarboxylic acid, polycarboxylic anhydride, mono- or polycarboxylic acid chloride, or mono- or polycarboxylic ester, wherein the ester is preferably derived from a $C_1$ to $C_5$ alcohol. In this regard, particularly preferred are $C_4$ to $C_{10}$ dicarboxylic acids and their anhydrids and (half)esters and $C_3$ to $C_{10}$ monocarboxylic acids and their esters, wherein the ester is preferably derived from a $C_1$ to $C_5$ alcohol.

An exemplary ester of a dicarboxylic acid is diethylester of fumaric acid.

Preferably, the acylating agent is selected from the group of acrylic acid, methacrylic acid, methyl acrylate, methyl methacrylate, maleic acid, maleic anhydride, fumaric acid, itaconic acid, itaconic anhydride, diethylester of fumaric acid, and mixtures thereof. Maleic anhydride is herein particularly preferred.

Methods of making a polyisobutylene-substituted acylating agent from the reaction of polyisobutylene and an acylating agent like a monounsaturated carboxylic acid reactant are well known. In this regard it is referred to the prior art referred to in WO 2006/135881 A2 on page 7.

According to a particular preferred embodiment of the present disclosure the polyisobutylene-substituted acylating agent comprises, more preferably consists of, polyisobutylene succinic anhydride. In this regard it is preferred that the polyisobutylene moiety of the polyisobutylene-substituted acylating agent has a number average molecular weight of 300 to 5000 g/mol. More preferred ranges are 450 to 4000 g/mol, 500 to 3000 g/mol and 550 to 2500 g/mol.

Compound Having a Nitrogen Atom

The compound having a nitrogen atom is capable of reacting with the polyisobutylene-substituted acylating agent and further has a tertiary amino group. The reaction of the polyisobutylene-substituted acylating agent and the compound having a nitrogen atom capable of reacting with said acylating agent is a nucleophilic substitution reaction at an acyl group of the acylating agent resulting in a polyisobutylene-substituted amide or imide.

In case one nitrogen atom reacts with one acyl group, the resulting functional group is an amide group. In case one nitrogen atom reacts with two acyl groups, the resulting functional group is an imide group.

Preferably, in the compound having a nitrogen atom capable of reacting with the acylating agent and further having a tertiary amino group the nitrogen atom capable of reacting with the acylating agent and the tertiary amino group are linked by a direct covalent bond or by a linker group comprising between 1 and 6 carbon atoms.

Preferably, the compound having a nitrogen atom capable of reacting with the acylating agent and further having a tertiary amino group is selected from the group of N,N- dimethyl-1,3-diaminopropane, N,N-diethyl-1,3-diaminopropane, N,N-dibutyl-1,3-diaminopropane, N,N-dimethylethylenediamine, N,N-diethylethylenediamine, N,N-dibutylethylenediamine, 1-(3-aminopropyl)imidazole, 4-(3-aminopropyl)morpholine, 1-(2-aminoethyl)piperidine, 3,3'-diamino-N-methyldipropylamine, 3,3'-aminobis(N,N-dimethylpropylamine), 1-aminopiperidine, 1-(3-aminopropyl)-2-pipecoline, 1-methyl-(4-methylamino)piperidine, 4-(1-pyrrolidinyl)piperidine, 1-(2-aminoethyl)pyrrolidine, 2-(2-amino ethyl)-1-methylpyrrolidine, N,N,N'-trimethylethylenediamine, N,N-dimethyl-N'-ethylethylenediamine, N,N-diethyl-N'-methylethylenediamine, N,N,N'-triethylethylenediamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-methyldipropylamine, 3,3'-iminobis(N,N-dimethylpropylamine), and mixtures thereof.

Preferably, in the compound having a nitrogen atom capable of reacting with the acylating agent and further having a tertiary amino group the nitrogen atom capable of reacting with the acylating agent is part of a primary amino group. More preferably, the compound contains merely one primary amino group and one tertiary amino group.

According to a particular preferred embodiment of the present disclosure the compound having a nitrogen atom capable of reacting with the acylating agent and further having a tertiary amino group comprises, more preferably consists of, N,N-dimethyl-1,3-diaminopropane.

Polyisobutylene Substituted Amide or Imide

The polyisobutylene-substituted amide or imide is the product of the reaction of the polyisobutylene-substituted acylating agent and the compound having a nitrogen atom capable of reacting with said acylating agent and further having a tertiary amino group. Hence, the polyisobutylene-substituted amide or imide contains a tertiary amino group.

Such a nucleophilic substitution reaction at an acyl group is conventional for the skilled person. In this regard it is referred to the disclosure of WO 2006/135881 A2, WO 2006/138269 A2, WO 2010/132259 A1, and WO 2012/004300 A1.

Quaternizing Agent

The quaternizing agent is suitable for converting a tertiary amino group to a quaternary ammonium group.

Hence, the quaternizing agent reacts with a tertiary amino group of a non-quaternized derivative of polyisobutylene resulting in the quaternized derivative of polyisobutylene.

Preferably, the quaternizing agent reacts with the polyisobutylene-substituted amide or imide as defined above.

Quaternizing agents and suitable reaction conditions are known to the skilled person. In this regard it is referred to the disclosure of WO 2006/135881 A2, WO 2006/138269 A2, WO 2010/132259 A1, and WO 2012/004300 A1.

Preferably, the quaternizing agent is selected from the group of ethylene oxide, propylene oxide, butylene oxide, styrene oxide and other hydrocarbyl epoxides, dialkyl sulfates, alkyl halides, benzyl halides, hydrocarbyl substituted carbonates, and mixtures thereof.

Suitable hydrocarbyl epoxides are accordingly aliphatic and aromatic alkylene oxides, such as especially $C_{2-12}$-alkylene oxides, such as ethylene oxide, propylene oxide, 1,2-butylene oxide, 2,3-butylene oxide, 2-methyl-1,2-propene oxide (isobutene oxide), 1,2-pentene oxide, 2,3-pentene oxide, 2-methyl-1,2-butene oxide, 3-methyl-1,2-butene oxide, 1,2-hexene oxide, 2,3-hexene oxide, 3,4-hexene oxide, 2-methyl-1,2-pentene oxide, 2-ethyl-1,2-butene oxide, 3-methyl-1,2-pentene oxide, 1,2-decene oxide, 1,2-dodecene oxide or 4-methyl-1,2-pentene oxide; and also aromatic-substituted ethylene oxides, such as optionally substituted styrene oxide, especially styrene oxide or 4-methylstyrene oxide.

Particularly preferred quaternizing agents are hydrocarbyl epoxides, in particular ethylene oxide, propylene oxide, and butylene oxide. Propylene oxide is most preferred.

In the case of use of epoxides as quaternizing agents, they are used especially in the absence of free acids, especially in the absence of free protic acids, such as in particular of $C_{1-12}$-monocarboxylic acids such as formic acid, acetic acid or propionic acid, or $C_{2-12}$-dicarboxylic acids such as oxalic acid or adipic acid; or else in the absence of sulfonic acids such as benzenesulfonic acid or toluenesulfonic acid, or aqueous mineral acids such as sulfuric acid or hydrochloric acid. The quaternization product thus prepared is thus "acid-free".

In this regard it is also particularly referred to the disclosure of WO 2012/004300 A1.

Quaternized Derivative of Polyisobutylene

It is herein preferred that the quaternary ammonium group contains four groups attached to the nitrogen atom, wherein these groups are independently aliphatic or aromatic groups having from 1 to 6 carbon atoms.

In this regard it is further preferred that these groups are independently alkyl or aryl groups having from 1 to 6 carbon atoms, optionally independently at least one of these groups carrying one or more hydroxyl groups.

In this regard it is further preferred that at least two of these groups are identical and more preferably are methyl groups. In this regard it is further preferred that at least two of these groups are identical and more preferably are methyl groups, and that a further of these groups carries a hydroxyl group, more preferably one hydroxyl group.

The fourth of these groups is the linker group to the nitrogen atom which has reacted with the polyisobutylene-substituted acylating agent.

According to a particular preferred embodiment of the present disclosure two of these groups are methyl groups, one is a 2-hydroxypropyl group, and the fourth of these groups linked to the nitrogen atom which has reacted with the polyisobutylene-substituted acylating agent is a (divalent) propyl group.

In this regard it is further preferred that the polyisobutylene-substituted acylating agent is a polyisobutylene succinic anhydride.

Hence, according to a particular preferred embodiment of the present disclosure, the quaternized derivative of polyisobutylene is the reaction product of:
  a) the reaction of polyisobutylene succinic anhydride and N,N-dimethyl-1,3-diaminopropane resulting in a polyisobutylene-substituted amide or imide; and
  b) propylene oxide.

A particular preferred compound is accordingly represented by the following formula I:

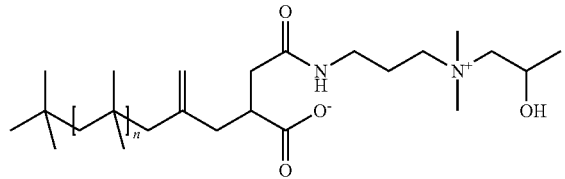

Formula I

Use of Quaternized Derivative of Polyisobutylene as Stabiliser in Inverse Emulsions As indicated above, the present disclosure is directed to the use of a quaternized derivative of polyisobutylene as stabiliser in inverse emulsions.

The use according to the present disclosure involves in particular the use as stabiliser for the synthesis and stabilization of inverse emulsions, more particularly the use as stabiliser in inverse emulsions used for a reverse-phase emulsion polymerisation process, e.g. for the polymerisation of acrylamide, ethylenically unsaturated cationic monomers or ethylenically unsaturated anionic monomers. Such emulsions are e.g. used as flocculant for waste water treatment.

It is desirable that the content of polymer solids in the emulsions should be as high as possible, consistent with the emulsion having a low enough viscosity for it to be easily handled. To overcome the problem of rather low shear stability of the emulsion which leads to lump formation, a polymeric stabilizer is added.

The use of quaternized derivative of polyisobutylene as stabiliser in inverse emulsions according to the present disclosure allows the preparation of inverse emulsions with sufficiently low viscosity and sufficiently high shear stability.

The amount of quaternized derivative of polyisobutylene in the inverse emulsion is preferably 0.025 to 3.00 wt %, more preferably 0.05 to 2.50 wt %, based on the weight of the entire inverse emulsion.

Inverse Emulsion

The present disclosure is in a further aspect directed to an inverse emulsion comprising a quaternized derivative of polyisobutylene as defined above in connection with the aspect of the present disclosure which is directed to the use of the quaternized derivative of polyisobutylene as stabiliser in inverse emulsions, including all preferred embodiments.

Preferably, the inverse emulsion is suitable for a reverse-phase emulsion polymerisation process, more preferably for the polymerisation of acrylamide, ethylenically unsaturated cationic monomers, or ethylenically unsaturated anionic monomers, still more preferably the inverse emulsion contains in addition acrylamide and/or polyacrylamide. Preferred is also a reverse emulsion in which polymerization is already completed, i.e. which e.g. contains polyacrylamide and is more preferably suitable as flocculant for waste water treatment.

The terms "reverse-phase emulsion polymerisation process" and "inverse emulsion polymerisation process" as used herein are synonyms.

Inverse Emulsion Polymerisation Process

The present disclosure is in a further aspect directed to an inverse emulsion polymerisation process, wherein the inverse emulsion comprises a quaternized derivative of polyisobutylene as defined above in connection with the aspect of the present disclosure which is directed to the use of the quaternized derivative of polyisobutylene as stabiliser in inverse emulsions, including all preferred embodiments.

Preferably, the process involves the polymerisation of acrylamide, ethylenically unsaturated cationic monomers, or ethylenically unsaturated anionic monomers.

EXAMPLES

In the examples the following compounds are used.
Poly Stab a polymeric stabilizer which is a quaternized derivative of polyisobutylene based on polyisobutylene succinic anhydride as polyisobutylene-substituted acylating agent, N,N-dimethyl-1,3-diaminopropane, and propylene oxide according to formula I, as 50 wt % solution in mineral oil
Span a nonionic surfactant based on sorbitane monooleate which is commercially available from Croda International PLC under the tradename Span® 80
Hypermer an oil soluble/water dispersible oligomeric ester used as dispersant which is commercially available from Croda International PLC under the tradename Hypermer 2296
Exxsol a hydrocarbon fraction (C12-C15) with low aromatic content (<2%), commercially available from ExxonMobil Chemical under the tradename Exxsol D 100 S
DMA3Q a cationic monomer; acrylic acid derivative: (ethanaminium N,N,N-trimethyl-2-[(1-oxo-2-propenyl)oxy]-,chloride, commercially available from BASF SE under the tradename DMA3Q
Trilon C a chelating agent, pentanatrium(carboxylatomethypiminobis(ethylennitrilo)-tetraacetat], commercially available from BASF SE under the tradename Trilon C Example 1

Inverse emulsions with the recipe as shown in Table 1 below were prepared according to the following procedure.

An oil phase is made by mixing 295 g of Exxsol D 100 S, 25.4 g of Span 80 and 5.2 g of Hypermer 2296 in a glass vessel. The aqueous phase is made by mixing 589.8 g of aq. acrylamide solution (51%), 178.4 g of aq. DMA3Q solution (80%), 0.118 g of $NaBrO_3$, 4.4 g of demineralized water, 0.595 g of formic acid, 0.7 g of Trilon C and 14 g of adipic acid in a beaker. The glass vessel is put under a Silverson-Disperser and the aqueous phase is added within 10 s to the oil phase under stirring. After the addition, the emulsion is stirred for 3 min. Subsequently, the glass vessel containing the emulsion is flange-mounted to the reactor equipment. The monomer emulsion is cooled to 10° C. and purged with $N_2$ for one hour. The polymerization is started with 10.6 mL of a 0.2 wt % $Na_2S_2O_5$ solution which is slowly added to ensure a temperature rise of 1° C./min. When 40° C. is reached, the temperature is kept constant by external cooling. Polymerisation is progressing as the before mentioned $Na_2S_2O_5$ solution is added. The total reaction time is 90 min followed by 30 min post reaction at 40° C.

After cooling, a breaker surfactant is added (2 wt % of a water-in-oil emulsifier, isotridecanolethoxylate).

Examples 2 to 9 are prepared in the same manner with variation of the oil phase according to Table 1.

TABLE 1

| Recipe of examples (amount in g) | | | | |
|---|---|---|---|---|
| | Exxsol | Span | Hypermer | Poly Stab |
| Example 1 | 295 | 25.4 | 5.2 | — |
| Example 2 | 301.7 | 25.9 | 4.13 | — |
| Example 3 | 307.7 | 24.3 | 6.7 | — |
| Example 4 | 283.4 | — | 6.7 | 48.6 |
| Example 5 | 301 | 24.3 | — | 13.4 |
| Example 6 | 304 | — | — | 34.2 |
| Example 7 | 321.1 | — | — | 17.1 |
| Example 8 | 315.9 | 11.4 | — | 11.4 |
| Example 9 | 307.7 | 29.6 | — | 1.4 |

Shear Stability Tests—Tcoagulate

Shear Stability tests were performed using Physica MCR rheometer in plate-plate geometry (25 mm, 50 micrometers distance) at 40° C. for maximal one hour at the shear rate of 3500 $s^{-1}$. Each measurement was repeated three times. Coagulation is defined as onset of abrupt viscosity increase upon shearing.

The time until coagulation which occurs under this condition, $T_{coagulate}$, is determined. The results and further properties of the emulsions are indicated in Table 2. Stated time ranges reflects the lowest and the highest value from three repetitions.

K-Value

The K-Value according Fikentscher, is a measure for the average molecular weight of the polymers and was calculated by the following equation and formula, respectively, according DIN EN ISO 1628-1:2010-10, p. 8:

K-value=1 000 k, with $$k = \frac{1,5lg\eta_r - 1 + \sqrt{1 + \left(\frac{2}{c} + 2 + 1,5lg\eta_r\right)1,5lg\eta_r}}{150 + 300c}$$

whereby c is the polymer concentration in $g/cm^3$ and $\eta_r$ the viscosity ratio $\eta_r = \eta/\eta_0$ of the polymer solution Viscosity The viscosity of the final product was determined by a Brookfield viscosimeter.

PSD—Particle Size Distribution

Particle size distribution was measured using Mastersizer S (lens range 300 mm) in stirred cell using Exxol D100+ 2.5% Span 80 as solvent for dilution. Refractive index of solvent is 1.449. Particle refractive index is 1.599 (imagenary part 0) Analysis model: polydisperse.

TABLE 2

| Example | K-Value | Viscosity/mPas | PSD/μm | Tcoagulate/sec |
|---|---|---|---|---|
| 1 | 270.7 | 1050 | 0.5-1.0 | 700-1200 |
| 2 | 267 | 900 | 0.5-1.0 | 450-600 |
| 3 | 250 | — | 0.5-2.0 | 600 |
| 4 | 247 | 1150 | 0.5-1.0 | >3600 |
| 5 | 253 | 950 | 0.5-1.0 | >3600 |
| 6 | 248 | 450 | 0.5-1.3 | >3600 |
| 7 | 249 | 250 | 0.5-4.0 | >3600 |
| 8 | 246 | 400 | 0.5-2.0 | >3600 |
| 9 | 250 | 600 | 0.5-1.2 | 400 |

The examples show that the quaternized derivative of polyisobutylene according to the present disclosure (in Examples 4-9) provides improved stability to the emulsions in view of conventional compounds, either used alone (Examples 6 and 7) or in combination with merely one of these conventional compounds (Examples 4, 5, 8, 9).

The invention claimed is:

1. An inverse emulsion stabilizer comprising a quaternized derivative of polyisobutylene.

2. An inverse emulsion polymerization process, wherein the inverse emulsion comprises a reaction product of a quaternized derivative of polyisobutylene by
   a) reacting a polyisobutylene-substituted acylating agent and a compound having a nitrogen atom capable of reacting with said acylating agent and further having a tertiary amino group; and
   b) a quaternizing agent suitable for converting the tertiary amino group to a quaternary ammonium group;
   wherein the reaction of the polyisobutylene-substituted acylating agent and the compound having a nitrogen atom capable of reacting with said acylating agent is a nucleophilic substitution reaction at an acyl group of the acylating agent resulting in a polyisobutylene-substituted amide or imide.

3. The polymerization process according to claim 2, wherein the polyisobutylene-substituted acylating agent is the reaction product of a polyisobutylene and an acylating agent.

4. The polymerization process according to claim 3, wherein the acylating agent is an alpha, beta-unsaturated mono- or polycarboxylic acid, polycarboxylic anhydride, mono- or polycarboxylic acid chloride, or mono- or polycarboxylic ester.

5. The polymerization process according to claim 2, wherein the acylating agent is selected from the group consisting of acrylic acid, methacrylic acid, methyl acrylate, methyl methacrylate, maleic acid, maleic anhydride, fumaric acid, itaconic acid, itaconic anhydride, diethylester of fumaric acid, and mixtures thereof.

6. The polymerization process according to claim 2, wherein the polyisobutylene has a number average molecular weight of 300 to 5000 g/mol.

7. The polymerization process according to claim 2, wherein the polyisobutylene-substituted acylating agent comprises polyisobutylene succinic anhydride.

8. The polymerization process according to claim 7, wherein the polyisobutylene moiety of the polyisobutylene-substituted acylating agent has a number average molecular weight of 300 to 5000 g/mol.

9. The polymerization process according to claim 2, wherein in the compound having a nitrogen atom capable of reacting with the acylating agent and further having a tertiary amino group the nitrogen atom capable of reacting with the acylating agent and the tertiary amino group are linked by a direct covalent bond or by a linker group comprising between 1 and 6 carbon atoms.

10. The polymerization process according to claim 2, wherein the compound having a nitrogen atom capable of reacting with the acylating agent and further having a tertiary amino group is selected from the group of N,N-dimethyl-1,3-diaminopropane, N,N-diethyl-1,3-diaminopropane, N,N-dibutyl-1,3-diaminopropane, N,N-dimethylethylenediamine, N,N-diethylethylenediamine, N,N-dibutylethylenediamine, 1-(3-aminopropyl) imidazole, 4-(3-aminopropyl) morpholine, 1-(2-aminoethyl) piperidine, 3,3'-diamino-N-methyldipropylamine, 3,3'-aminobis (N,N-dimethylpropylamine), 1-aminopiperidine, 1-(3-aminopropyl)-2-pipecoline, 1-methyl-(4-methylamino) piperidine, 4-(1-pyrrolidinyl) piperidine, 1-(2-aminoethyl) pyrrolidine, 2-(2-aminoethyl)-1-methylpyrrolidine, N,N,N'-trimethylethylenediamine, N,N-dimethyl-N'-ethylethylenediamine, N,N-diethyl-N'-methylethylenediamine, N,N,N'-triethylethylenediamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-methyldipropylamine, 3,3'-iminobis (N,N-dimethylpropylamine), and mixtures thereof.

11. The polymerization process according to claim 2, wherein in the compound having a nitrogen atom capable of reacting with the acylating agent and further having a tertiary amino group the nitrogen atom capable of reacting with the acylating agent is part of a primary amino group.

12. The polymerization process according to claim 2, wherein the quaternizing agent is selected from the group of ethylene oxide, propylene oxide, butylene oxide, styrene oxide, dialkyl sulfates, alkyl halides, benzyl halides, hydrocarbyl substituted carbonates, and mixtures thereof.

13. The polymerization process according to claim 2, wherein the quaternary ammonium group comprises four groups attached to the nitrogen atom, wherein these groups are independently aliphatic or aromatic groups having from 1 to 6 carbon atoms.

14. The polymerization process according to claim 13, wherein the groups attached to the nitrogen atom are independently alkyl or aryl groups having from 1 to 6 carbon atoms, optionally independently at least one of these groups carrying one or more hydroxyl groups.

15. The polymerization process according to claim 14, wherein at least two of the groups attached to the nitrogen atom are identical.

* * * * *